(12) United States Patent
Ishihara

(10) Patent No.: US 12,732,126 B2
(45) Date of Patent: Sep. 8, 2026

(54) SWITCHING DEVICE FOR AC MOTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kanzo Ishihara, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 240 days.

(21) Appl. No.: 18/721,307

(22) PCT Filed: Dec. 21, 2022

(86) PCT No.: PCT/JP2022/047066
§ 371 (c)(1),
(2) Date: Jun. 18, 2024

(87) PCT Pub. No.: WO2023/120568
PCT Pub. Date: Jun. 29, 2023

(65) Prior Publication Data

US 2025/0062711 A1 Feb. 20, 2025

(30) Foreign Application Priority Data

Dec. 22, 2021 (JP) ................................ 2021-208011

(51) Int. Cl.
*H02M 7/00* (2006.01)
*H02P 25/18* (2006.01)
*H02P 25/22* (2006.01)

(52) U.S. Cl.
CPC ........... *H02P 25/182* (2013.01); *H02P 25/22* (2013.01)

(58) Field of Classification Search
CPC ........ H02M 7/003; H02P 25/182; H02P 25/22
See application file for complete search history.

(56) References Cited

U.S. PATENT DOCUMENTS

2004/0195994 A1 10/2004 Kume et al.
2020/0162012 A1* 5/2020 Woodley ............... H02M 7/003
2023/0327584 A1* 10/2023 Kawazu ................. B64D 27/34 318/41

FOREIGN PATENT DOCUMENTS

JP 2012-227980 A 11/2012

OTHER PUBLICATIONS

International Search Report, Application No. PCT/JP2022/047066, mailed Jan. 31, 2023. ISA/Japan Patent Office.

* cited by examiner

*Primary Examiner* — Cortez M Cook
(74) *Attorney, Agent, or Firm* — Brooks Kushman P.C.

(57) ABSTRACT

A switching device for an AC motor is a device for controlling switching of an AC motor, and includes a switching unit that switches a connection state of a plurality of phase windings. The switching unit switches between a first state, a second state, and a third state. The first state is a state in which electrical conduction control on first windings of the phases is allowed, and electrical conduction control on second windings is blocked. The second state is a state in which electrical conduction control on the second windings of the phases is allowed, and electrical conduction control on the first windings is blocked. The third state is a state in which electrical conduction control on the first windings and the second windings is allowed.

2 Claims, 7 Drawing Sheets

FIG. 2

| | First Switching Unit | Second Switching Unit | Third Switching Unit | Electrical Conduction Target Windings |
|---|---|---|---|---|
| First state | Short-circuit state | Release state | Short-circuit state | First windings |
| Second state | Release state | Short-circuit state | Release state | Second windings |
| Third state | Short-circuit state | Release state | Release state | Both windings |
| Fourth state | Release state | Release state | Release state | None |

1
2
6
10
4
90
71B
72B
73B
71A
72A
73A
20
21
22
23
21A
21B
21C
22A
22B
22C
23A
23B
23C
61A
62A
63A
61B
62B
63B
30
Control unit
81
82

SWITCHING DEVICE FOR AC MOTOR

CROSS-REFERENCE TO RELATED APPLICATIONS

This application is the U.S. national stage of PCT/JP2022/047066 filed on Dec. 21, 2022, which claims priority of Japanese Patent Application No. JP 2021-208011 filed on Dec. 22, 2021, the contents of which are incorporated herein.

TECHNICAL FIELD

The present disclosure relates to a switching device for an AC motor.

BACKGROUND

In an AC motor disclosed in JP 2003-111492A, each phase winding is constituted by a plurality of windings, and a connection terminal that connects the plurality of windings to each other and both terminals of each phase winding are provided outside the motor. Also, a winding switching device includes a winding switching means for switching the connection terminals as appropriate, and a variable frequency power source that supplies a variable voltage having a variable frequency to the AC motor.

With the technology disclosed in JP 2003-111492A, each phase winding of the AC motor is divided into a plurality of regions, and it is possible to switch between a usage state in which only some of the regions of each phase winding are used and a usage state in which other regions are also used in addition to some of the regions of each phase winding. However, in the technology disclosed in JP 2003-111492A, it is essential to use the above-mentioned partial region of each phase when switching a connection state of the phase windings, and thus operation patterns are restricted in this respect.

An object of the present disclosure is to provide a technique with which the number of operation patterns of an AC motor can be easily increased.

SUMMARY

A switching device for an AC motor of the present disclosure is a switching device for switching a connection state of windings of an AC motor having a plurality of phase windings, each phase winding including a first winding and a second winding, the switching device including: a switching unit configured to switch a connection state of the plurality of phase windings, in which the switching unit switches between a first state in which electrical conduction control on the first windings of the phase windings is allowed and electrical conduction control on the second windings of the phase windings is blocked, a second state in which electrical conduction control on the second windings of the phase windings is allowed and electrical conduction control on the first windings of the phase windings is blocked, and a third state in which electrical conduction control on the first windings and the second windings of the phase windings is allowed.

Advantageous Effects

It is possible to increase the number of operation patterns of an AC motor using technology according to the present disclosure.

BRIEF DESCRIPTION OF DRAWINGS

FIG. 2 is a diagram illustrating a correspondence relationship between an electrical conduction target winding and a state of each switching unit in the switching device for an AC motor according to the first embodiment, and the like.

DETAILED DESCRIPTION OF PREFERRED EMBODIMENTS

Figure 1:
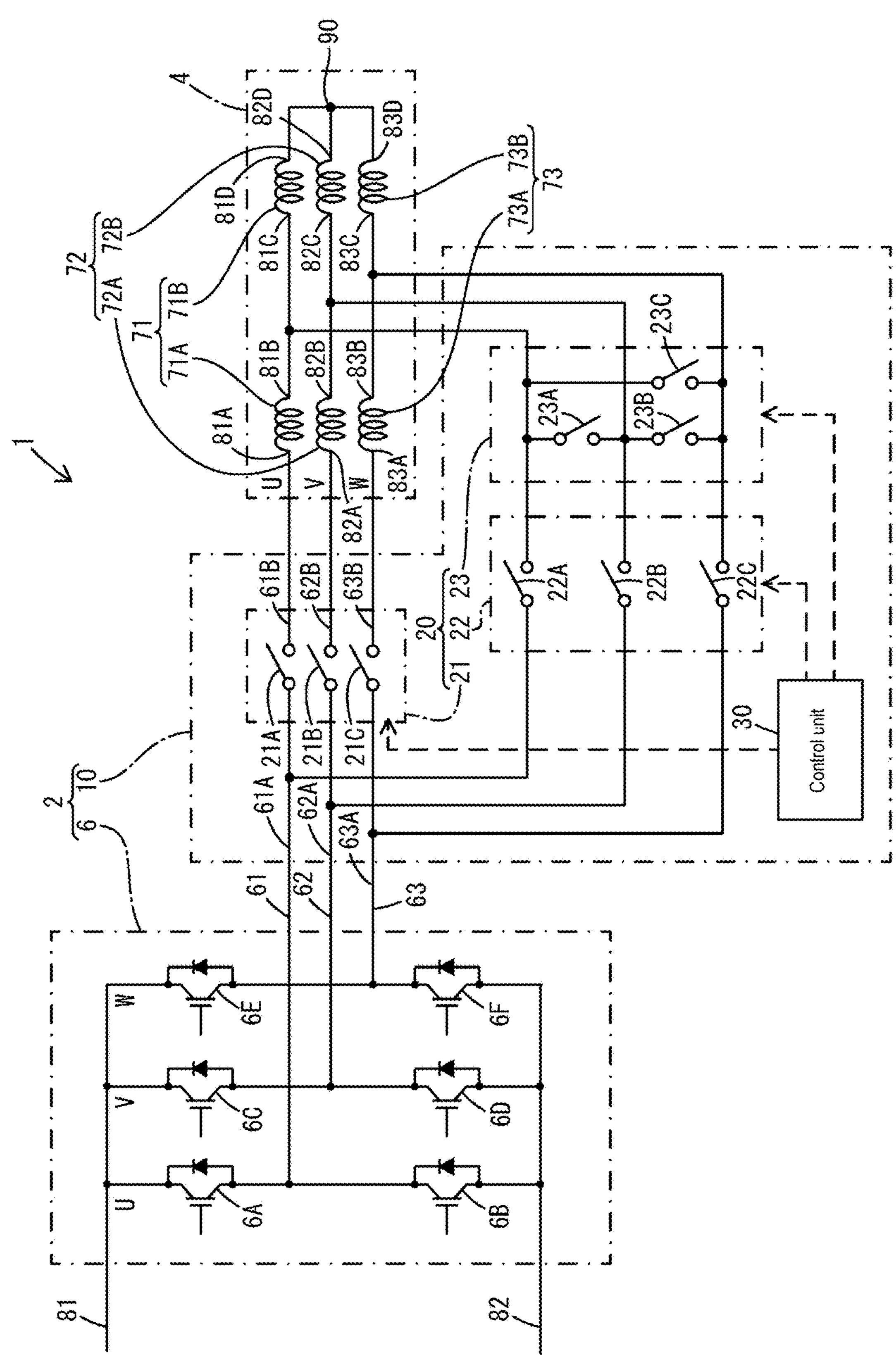
FIG. 1 is a circuit diagram schematically illustrating an on-board system including a switching device for an AC motor according to a first embodiment.

Hereinafter, embodiments of the present disclosure will be listed and described. Note that the features of the first through the fourth aspects exemplified below may be combined in any manner as long as no contradictions arise.

In a first aspect, a switching device for an AC motor, the switching device being for switching a connection state of windings of an AC motor having a plurality of phase windings, each phase winding including a first winding and a second winding. The switching device includes a switching unit configured to switch a connection state of the plurality of phase windings, in which the switching unit switches between a first state in which electrical conduction control on the first windings of the phase windings is allowed and electrical conduction control on the second windings of the phase windings is blocked, a second state in which electrical conduction control on the second windings of the phase windings is allowed and electrical conduction control on the first windings of the phase windings is blocked, and a third state in which electrical conduction control on the first windings and the second windings of the phase windings is allowed.

In the switching device according to the first aspect, the first state is an operation pattern in which the first windings of the phase windings are selectively used and the second windings are selectively not used, and the second state is an operation pattern in which the second windings of the phase windings are selectively used and the first windings are selectively not used. Thus, the switching device can generate an operation pattern in which the first windings are used while the influence of the second windings is suppressed, and an operation pattern in which the second windings are used while the influence of the first windings is suppressed. Furthermore, the switching device can also generate an operation pattern in which the first windings and the second windings are used, and thus can increase the number of operation patterns of the AC motor.

In a second aspect, the switching device for an AC motor according to the first aspect further includes a control unit configured to control the switching unit, in which the plurality of phase windings include a first phase winding, a second phase winding, and a third phase winding. The switching unit includes a first switching unit configured to switch between a first short-circuit state and a first release state, a second switching unit configured to switch between a second short-circuit state and a second release state, and a third switching unit configured to switch between a third short-circuit state and a third release state. The first short-circuit state is a state in which a first conduction path and a first end portion that is one end of the first winding in the first phase winding are short-circuited, a second conduction path and a second end portion that is one end of the first winding in the second phase winding are short-circuited, and a third conduction path and a third end portion that is one end of the first winding in the third phase winding are short-circuited. The first release state is a state in which the short circuit between the first end portion and the first conduction path is released, the short circuit between the second end portion and the second conduction path is released, and the short circuit between the third end portion and the third conduction path is released. The second short-circuit state is a state in which the first conduction path and a fourth end portion that is one end of the second winding in the first phase winding are short-circuited, the second conduction path and a fifth end portion that is one end of the second winding in the second phase winding are short-circuited, and the third conduction path and a sixth end portion that is one end of the second winding in the third phase winding are short-circuited. The second release state is a state in which the short circuit between the fourth end portion and the first conduction path is released, the short circuit between the fifth end portion and the second conduction path is released, and the short circuit between the sixth end portion and the third conduction path is released. The third short-circuit state is a state in which opposite ends that include an opposite end of the first winding of the first phase winding, an opposite end of the first winding of the second phase winding, and an opposite end of the first winding of the third phase winding are short-circuited to each other. The third release state is a state in which the short circuit of the opposite ends to each other is released, and the control unit causes the switching unit to enter the first state by causing the first switching unit to enter the first short-circuit state, the second switching unit to enter the second release state, and the third switching unit to enter the third short-circuit state, causes the switching unit to enter the second state by causing the first switching unit to enter the first release state, the second switching unit to enter the second short-circuit state, and the third switching unit to enter the third release state, and causes the switching unit to enter the third state by causing the first switching unit to enter the first short-circuit state, the second switching unit to enter the second release state, and the third switching unit to enter the third release state.

The switching device according to the second aspect is intended for three-phase AC motors, and it is possible to switch between at least three states (the first state, the second state, and the third state) using a simple method for changing the combination of the short-circuit states and the release states of the switching units.

The switching device for an AC motor according to the second aspect, in which the first winding of the first phase winding has a larger number of turns than the second winding of the first phase winding, the first winding of the second phase winding has a larger number of turns than the second winding of the second phase winding, and the first winding of the third phase winding has a larger number of turns than the second winding of the third phase winding.

The switching device according to the third aspect can selectively use the first windings having a relatively large number of turns in the first state, and thus impedance can be increased and larger torque can be generated with ease. On the other hand, the switching device can selectively use the second windings having a relatively small number of turns in the second state, and thus impedance can be suppressed and suitability for high-speed operation can be enhanced with ease. In the third state, it is possible to use not only the first windings having a relatively large number of turns but also the second windings, and thus torque can be further increased with ease.

In a fourth aspect, the switching device for an AC motor according to the third aspect, in which the control unit causes the switching unit to enter the third state when a rotation speed of a vehicle in which the switching device for an AC motor and the AC motor are mounted is within a first rotation speed range, causes the switching unit to enter the first state when the rotation speed of the vehicle is within a second rotation speed range in which the rotation speed is higher than the first rotation speed range, and causes the switching unit to enter the second state when the rotation speed of the vehicle is within a third rotation speed range in which the rotation speed is higher than the second rotation speed range.

The switching device according to the fourth aspect can switch to the first state in which the vehicle can be easily used for high-speed travel when the rotation speed of the vehicle is within the third rotation speed range in which the rotation speed of the vehicle is relatively high, and can switch to the third state in which torque can be easily increased, when the rotation speed of the vehicle is within the first rotation speed range in which the rotation speed of the vehicle is relatively low. Also, the switching device can switch to the second state in which torque and high-speed travel can be easily balanced, when the rotation speed of the vehicle is within the second rotation speed range in which the rotation speed of the vehicle is moderate.

First Embodiment

Overview of On-Board System

An on-board system 1 shown in FIG. 1 is a system applied to an AC motor 4 mounted in a vehicle, and is a motor system that can drive and control an AC motor 4. The on-board system 1 includes the AC motor 4 and a motor drive device 2.

The AC motor 4 is a three-phase AC motor. The AC motor 4 is, for example, a three-phase driving motor that generates a driving force for rotationally driving wheels provided on a vehicle in which the on-board system 1 is mounted. The AC motor 4 includes a plurality of phase (specifically, three phase) windings 71, 72, and 73. The plurality of phase windings 71, 72, and 73 function as stator windings provided in a stator. The winding 71 is also referred to as a U-phase winding 71. The winding 72 is also referred to as a V-phase winding 72. The winding 73 is also referred to as a W-phase winding 73. The U phase corresponds to an example of the first phase. The V phase corresponds to an example of the second phase. The W phase corresponds to an example of the third phase. The AC motor 4 is a so-called Y-connected three-phase motor. The U-phase (first phase) winding 71, the V-phase (second phase) winding 72, and the W-phase (third phase) winding 73 can be connected at the third switching unit 23, which can serve as a neutral point, or a short-circuit unit 90, which can serve as a neutral point.

The plurality of phase windings 71, 72, and 73 that constitute the AC motor 4 each have a first winding and a second winding, and the first winding and the second winding are connected in series in each phase. The U-phase (first-phase) winding 71 includes a first winding 71A and a second winding 71B, and the first winding 71A and the second winding 71B are connected in series. The V-phase (second-phase) winding 72 includes a first winding 72A and a second winding 72B, and the first winding 72A and the second winding 72B are connected in series. The W-phase (third-phase) winding 73 includes a first winding 73A and a second winding 73B, and the first winding 73A and the second winding 73B are connected in series.

An end portion 81A corresponds to an example of the first end portion. The end portion 81A is one end of the first winding 71A. The end portion 81A is electrically connected to a conduction path 61B of a U-phase conduction path 61, and is short-circuited to the conduction path 61B. An end portion 82A corresponds to an example of the second end portion. The end portion 82A is one end of the first winding 72A. The end portion 82A is electrically connected to a conduction path 62B of a V-phase conduction path 62, and is short-circuited to the conduction path 62B. An end portion 83A corresponds to an example of the third end portion. The end portion 83A is one end of the first winding 73A. The end portion 83A is electrically connected to a conduction path 63B of a W-phase conduction path 63, and is short-circuited to the conduction path 63B.

An end portion 81B is the opposite end of the first winding 71A. The end portion 81B is electrically connected to an end portion 81C, which is one end of the second winding 71B, and is short-circuited to the end portion 81C. The end portion 82B is the opposite end of the first winding 72A. An end portion 82B is electrically connected to an end portion 82C, which is one end of the second winding 72B, and is short-circuited to the end portion 82C. The end portion 83B is the opposite end of the first winding 73A. An end portion 83B is electrically connected to an end portion 83C, which is one end of the second winding 73B, and is short-circuited to the end portion 83C. An end portion 81D is the opposite end of the second winding 71B. An end portion 82D is the opposite end of the second winding 72B. An end portion 83D is the opposite end of the second winding 73B. The end portion 81D, the end portion 82D, and the end portion 83D are electrically connected to the short-circuit unit 90, and are short-circuited to each other via the short-circuit unit 90.

A pair of power paths 81 and 82 are conduction paths along which DC power based on power from a battery (e.g., a high voltage battery) (not shown) is transferred. The power path 81 is a power path on the high potential side. The power path 82 is a power path on the low potential side. For example, a constant DC voltage can be applied to the two power paths 81 and 82.

Overview of Motor Drive Device

A motor drive device 2 is a device that drives the AC motor 4 based on power supplied along the pair of power path 81 and 82. The motor drive device 2 is also a device that controls the operation of the AC motor 4. The motor drive device 2 includes an inverter 6, three conduction paths (the U-phase conduction path 61, the V-phase conduction path 62, and the W-phase conduction path 63), and a switching device 10.

The inverter 6 is an inverter circuit that outputs three-phase AC power of the U phase, the V phase, and the W phase. The three-phase AC power output from the inverter 6 is supplied to the AC motor 4 via the three conduction paths (the U-phase conduction path 61, the V-phase conduction path 62, and the W-phase conduction path 63), and is used to rotationally drive the AC motor 4. The inverter 6 includes switching elements 6A, 6C, and 6E that function as upper arm elements, and switching elements 6B, 6D, and 6F that function as lower arm elements. The switching elements 6A, 6B, 6C, 6D, 6E, and 6F are each constituted by, for example, an insulated-gate bipolar transistor (IGBT) and a freewheeling diode.

In the inverter 6, for example, the switching elements 6A, 6B, 6C, 6D, 6E, and 6F are repeatedly turned ON and OFF by receiving ON/OFF signals (e.g., PWM (pulse width modulation) signals), and generate three-phase AC power. The switching elements 6A, 6B, 6C, 6D, 6E, and 6F are turned ON/OFF under the control of, for example, an electronic control device (not shown) (e.g., an on-board ECU (Electronic Control Unit) or the like). A method by which the electronic control device controls the inverter 6 is, for example, a three-phase modulation method using PWM signals. Note that the method by which the electronic control device controls the inverter 6 may be any method as long as the AC motor 4 can be driven, and for example, various methods such as known V/f control and known vector control may be used.

In the inverter 6, the pair of U-phase switches include the switching element 6A, which is an upper arm element, and the switching element 6B, which is a lower arm element. The pair of V-phase switches include the switching element 6C, which is an upper arm element, and the switching element 6D, which is a lower arm element. The pair of W-phase switches include the switching element 6E, which is an upper arm element, and the switching element 6F, which is a lower arm element.

The U-phase conduction path 61 is a conduction path between the switching elements 6A and 6B and the U-phase winding 71. The U-phase conduction path 61 includes the conduction path 61A and the conduction path 61B. The conduction path 61A corresponds to an example of the first conduction path. The conduction path 61A is a conduction path between the switching elements 6A and 6B and a switch 21A. One end of the conduction path 61A is electrically connected to a conduction path between two elements, namely, the switching elements 6A and 6B. The opposite end of the conduction path 61A is electrically connected to one end of the switch 21A. The conduction path 61B is electrically connected to the opposite end of the switch 21A and one end of the U-phase winding 71. When the switch 21A is in an ON state, the switching elements 6A and 6B and the U-phase winding 71 may be short-circuited and electrically connected to each other.

The V-phase conduction path 62 is a conduction path between the switching elements 6C and 6D and the V-phase winding 72. The V-phase conduction path 62 includes the conduction path 62A and the conduction path 62B. The conduction path 62A corresponds to an example of the second conduction path. The conduction path 62A is a conduction path between the switching elements 6C and 6D and a switch 21B. One end of the conduction path 62A is electrically connected to a conduction path between two elements, namely, the switching elements 6C and 6D. The opposite end of the conduction path 62A is electrically connected to one end of the switch 21B. The conduction path 62B is electrically connected to the opposite end of the switch 21B and one end of the V-phase winding 72. When the switch 21B is in an ON state, the switching elements 6C and 6D and the V-phase winding 72 may be short-circuited and electrically connected to each other.

The W-phase conduction path 63 is a conduction path between the switching elements 6E and 6F and the W-phase winding 73. The W-phase conduction path 63 includes the conduction path 63A and the conduction path 63B. The conduction path 63A corresponds to an example of the third conduction path. The conduction path 63A is a conduction path between the switching elements 6E and 6F and a switch 21C. One end of the conduction path 63A is electrically connected to a conduction path between two elements, namely, the switching elements 6E and 6F. The opposite end of the conduction path 63A is electrically connected to one end of the switch 21C. The conduction path 63B is electrically connected to the opposite end of the switch 21C and one end of the W-phase winding 73. When the switch 21C is in an ON state, the switching elements 6E and 6F and the W-phase winding 73 may be short-circuited and electrically connected to each other.

Configuration of Switching Device

The switching device 10 is a device that switches between states of the windings of the AC motor 4. The switching device 10 includes a switching unit 20 and a control unit 30.

The control unit 30 is a device that controls the switching unit 20. The control unit 30 may be, for example, an electronic control device such as an on-board ECU, or an information processing apparatus having an MPU (Micro-Processing Unit) or the like. The switches that constitute the switching unit 20 are turned ON/OFF under the control of the control unit 30. Specifically, the control unit 30 may output ON signals and OFF signals to the switches 21A, 21B, 21C, 22A, 22B, 22C, 23A, 23B, and 23C.

The switching unit 20 is a device that switches a connection state of the plurality of phase windings 71, 72, and 73. The switching unit 20 includes a first switching unit 21, a second switching unit 22, and a third switching unit 23. The first switching unit 21 switches between a first short-circuit state and a first release state. The second switching unit 22 switches between a second short-circuit state and a second release state. The third switching unit 23 switches between a third short-circuit state and a third release state.

The first switching unit 21 includes the switches 21A, 21B, and 21C. Each of the switches 21A, 21B, and 21C may be constituted by one or more semiconductor switching elements (e.g., FETs (Field Effect Transistors) or IGBTs), or may be constituted by one or more mechanical relays.

The first short-circuit state is a state in which all of the switches 21A, 21B, and 21C are turned ON. When the switch 21A is in the ON state, current can flow in both directions through the switch 21A. When the switch 21B is in the ON state, current can flow in both directions through the switch 21B. When the switch 21C is in the ON state, current can flow in both directions through the switch 21C. That is, the first short-circuit state is a state in which the conduction path 61A (first conduction path) and the end portion 81A, which is one end of the U-phase first winding 71A, are short-circuited, the conduction path 62A (second conduction path) and the end portion 82A, which is one end of the V-phase first winding 72A, are short-circuited, and the conduction path 63A (third conduction path) and the end portion 83A, which is one end of the W-phase first winding 73A, are short-circuited.

The first release state is a state in which all of the switches 21A, 21B, and 21C are turned OFF. When the switch 21A is in the OFF state, bidirectional electrical conduction is cut off at the switch 21A. When the switch 21B is in the OFF state, bidirectional electrical conduction is cut off at the switch 21B. When the switch 21C is in the OFF state, bidirectional electrical conduction is cut off at the switch 21C. That is, the first release state is a state in which the short circuit between the end portion 81A (first end portion) and the conduction path 61A (first conduction path) is released, the short circuit between the end portion 82A (second end portion) and the conduction path 62A (second conduction path) is released, and the short circuit between the end portion 83A (third end portion) and the conduction path 63A (third conduction path) is released. In the first release state, no current flows between the conduction path 61A and the conduction path 61B, no current flows between the conduction path 62A and the conduction path 62B, and no current flows between the conduction path 63A and the conduction path 63B. In the first release state, no driving current is supplied to the first windings 71A, 72A, and 73A.

The second switching unit 22 includes the switches 22A, 22B, and 22C. Each of the switches 22A, 22B, and 22C may be constituted by one or more semiconductor switching elements (e.g., FETs or IGBTs), or may be constituted by one or more mechanical relays.

The second short-circuit state is a state in which all of the switches 22A, 22B, and 22C are turned ON. When the switch 22A is in the ON state, current can flow in both directions through the switch 22A. When the switch 22B is in the ON state, current can flow in both directions through the switch 22B. When the switch 22C is in the ON state, current can flow in both directions through the switch 22C. That is, the second short-circuit state is a state in which the end portion 81C (fourth end portion) and the conduction path 61A (first conduction path) are short-circuited, the end portion 82C (fifth end portion) and the conduction path 62A (second conduction path) are short-circuited, and the end portion 83C (sixth end portion) and the conduction path 63A (third conduction path) are short-circuited.

The second release state is a state in which all of the switches 22A, 22B, and 22C are turned OFF. When the switch 22A is in the OFF state, bidirectional electrical conduction is cut off at the switch 22A. When the switch 22B is in the OFF state, bidirectional electrical conduction is cut off at the switch 22B. When the switch 22C is in the OFF state, bidirectional electrical conduction is cut off at the switch 22C. That is, the second release state is a state in which the short circuit between the end portion 81C (fourth end portion) and the conduction path 61A (first conduction path) is released, the short circuit between the end portion 82C (fifth end portion) and the conduction path 62A (second conduction path) is released, and the short circuit between the end portion 83C (sixth end portion) and the conduction path 63A (third conduction path) is released.

The third short-circuit state is a state in which all of the switches 23A, 23B, and 23C are turned ON. When all of the switches 23A, 23B, and 23C are in the ON state, the opposite ends of the first windings 71A, 72A, and 73A are short-circuited to each other. When the switch 23A is in the ON state, current can flow in both directions through the switch 23A. When the switch 23B is in the ON state, current can flow in both directions through the switch 23B. When the switch 23C is in the ON state, current can flow in both directions through the switch 23C. The third short-circuit state is a state in which the end portion 81B, which is the opposite end of the U-phase first winding 71A, the end portion 82B, which is the opposite end of the V-phase first winding 72A, and the end portion 83B, which is the opposite end of the W-phase first winding 73A, are short-circuited to each other, and have the same potential. A plurality of end portions that are constituted by the end portions 81B, 82B, and 83B form the opposite ends, and the third short-circuit state is a state in which the opposite ends are short-circuited to each other and have the same potential.

The third release state is a state in which all of the switches 23A, 23B, and 23C are turned OFF. When the switch 23A is in the OFF state, bidirectional electrical conduction is cut off at the switch 23A. When the switch 23B is in the OFF state, bidirectional electrical conduction is cut off at the switch 23B. When the switch 23C is in the OFF state, bidirectional electrical conduction is cut off at the switch 23C. The third release state is a state in which the short circuit of the opposite ends to each other is released, and specifically, no current flows through the switches 23A, 23B, and 23C between the end portion 81B and the end portion 82B, between the end portion 82B and the end portion 83B, and between the end portion 81B and the end portion 83B.

Operation of Switching Device

In a representative example of this embodiment described below, the first winding 71A of the U-phase (first phase) winding 71 has a larger number of turns than the second winding 71B. The first winding 72A of the V-phase (second phase) winding 72 has a larger number of turns than the second winding 72B. The first winding 73A of the W-phase (third phase) winding 73 has a larger number of turns than the second winding 73B. That is, in any phase, the number of turns in the first winding is greater than the number of turns in the second winding.

The switching unit 20 switches between a first state, a second state, a third state, and a fourth state. The control unit 30 controls the switching unit 20 to switch the switching unit 20 to any one of the first state, the second state, the third state, and the fourth state.

Figure 3:
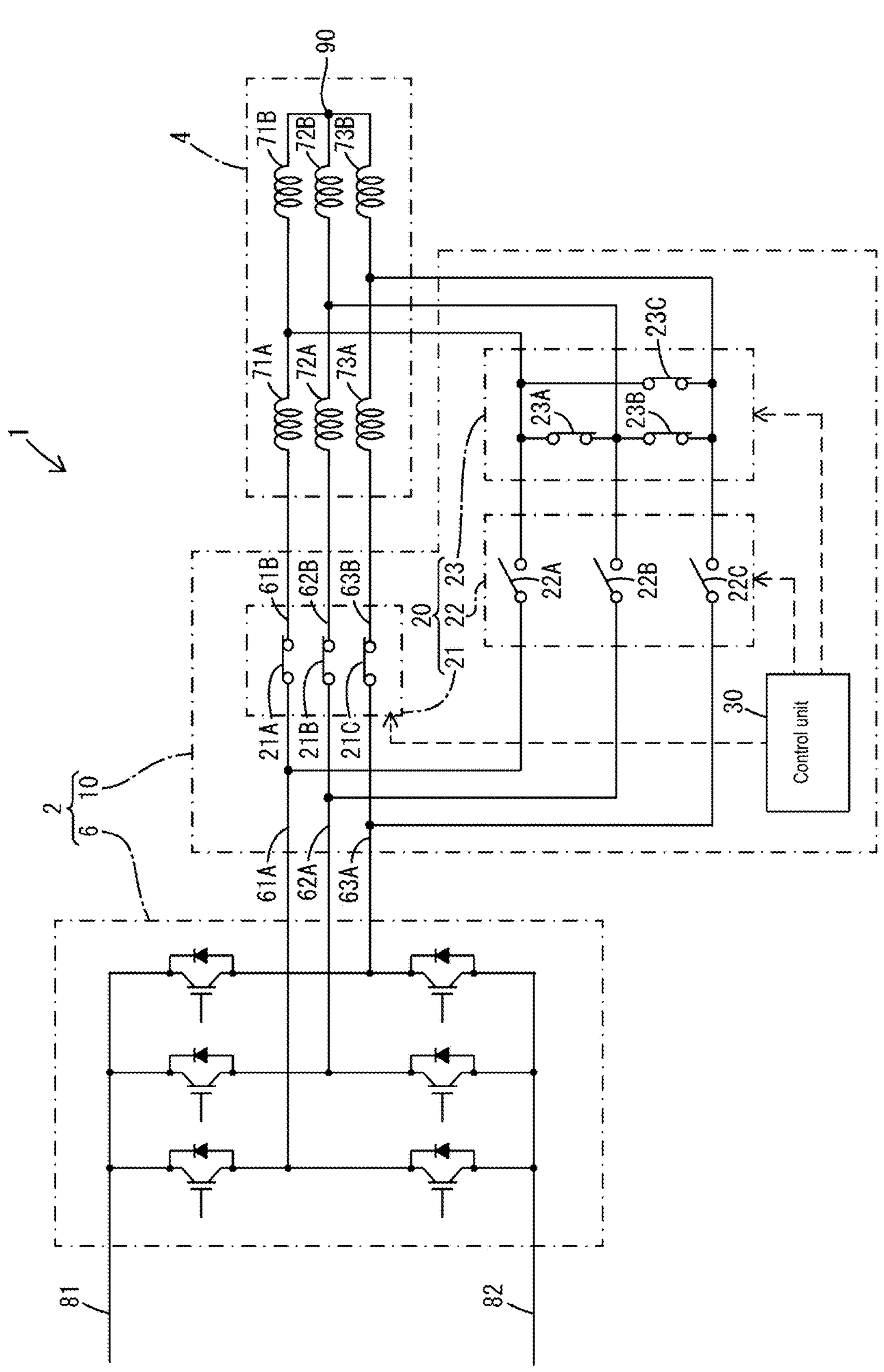
FIG. 3 is a diagram illustrating a first state of the switching device for an AC motor shown in FIG. 1.

As shown in FIG. 2, the first state is such that the first switching unit 21 is in the short-circuit state (first short-circuit state), the second switching unit 22 is in the release state (second release state), and the third switching unit 23 is in the short-circuit state (third short-circuit state). In the first state, electrical conduction target windings are the first windings 71A, 72A, and 73A. That is, the first state is a state in which electrical conduction control on the first windings 71A, 72A, and 73A of the plurality of phase windings 71, 72, and 73 is allowed, and electrical conduction control on the second windings 71B, 72B, and 73B is blocked. As shown in FIG. 3, in the first state, the switches 21A, 21B, and 21C are in the ON state, the switches 22A, 22B, and 22C are in the OFF state, and the switches 23A, 23B, and 23C are in the ON state, and the third switching unit 23 is the neutral point. Therefore, a driving current flows through the first windings 71A, 72A, and 73A, and no driving current flows through the second windings 71B, 72B, and 73B.

Figure 4:
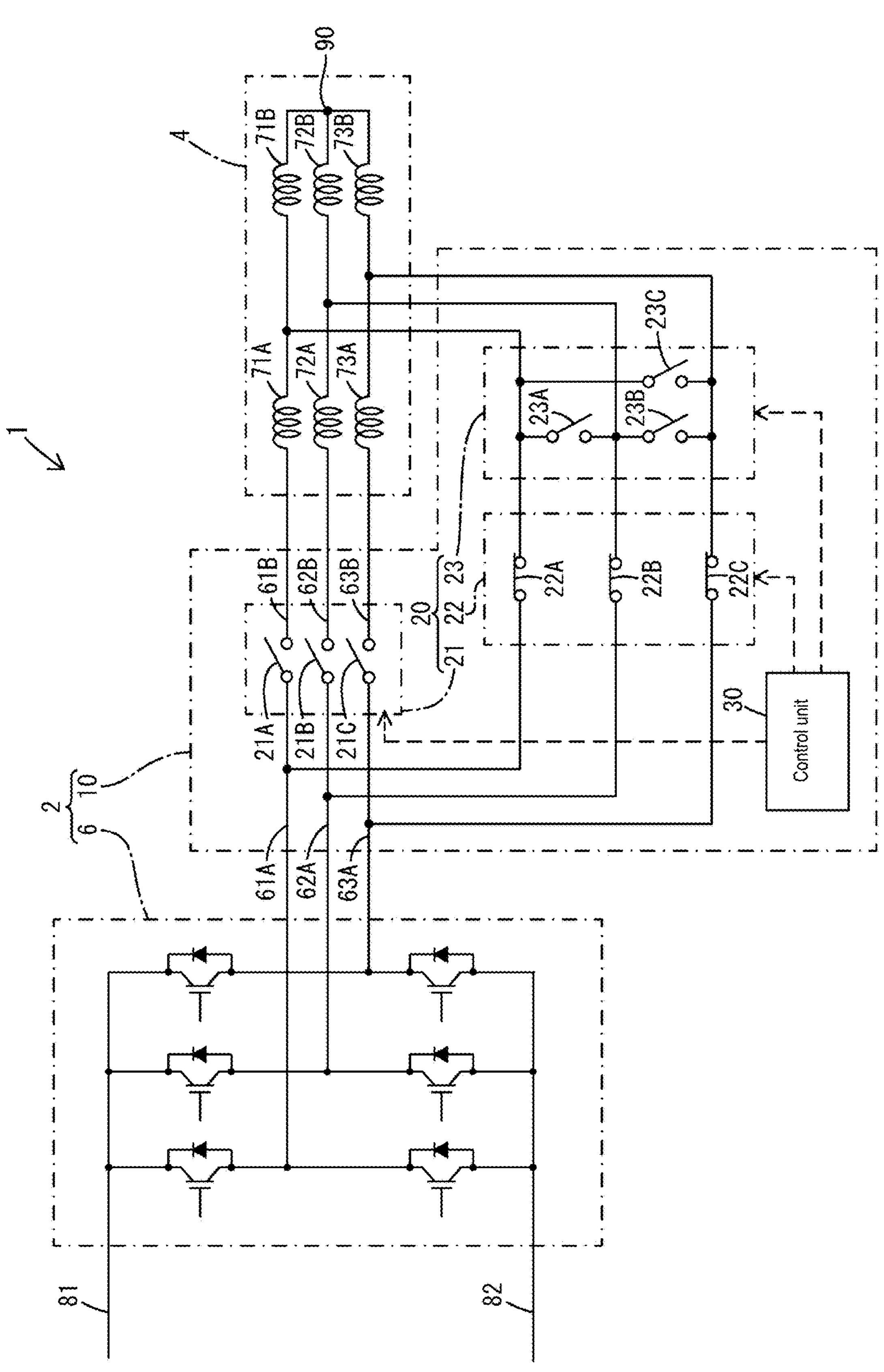
FIG. 4 is a diagram illustrating a second state of the switching device for an AC motor shown in FIG. 1.

As shown in FIG. 2, the second state is such that the first switching unit 21 is in the release state (first release state), the second switching unit 22 is in the short-circuit state (second short-circuit state), and the third switching unit 23 is in the release state (third release state). In the second state, electrical conduction target windings are the second windings 71B, 72B, and 73B. That is, the second state is a state in which electrical conduction control on the second windings 71B, 72B, and 73B of the plurality of phase windings 71, 72, and 73 is allowed, and electrical conduction control on the first windings 71A, 72A, and 73A is blocked. As shown in FIG. 4, in the second state, the switches 22A, 22B, and 22C are in the ON state, the switches 21A, 21B, and 21C are in the OFF state, and the switches 23A, 23B, and 23C are in the OFF state, and the short-circuit unit 90 is the neutral point. Therefore, a driving current flows through the second windings 71B, 72B, and 73B, and no driving current flows through the first windings 71A, 72A, and 73A.

Figure 5:
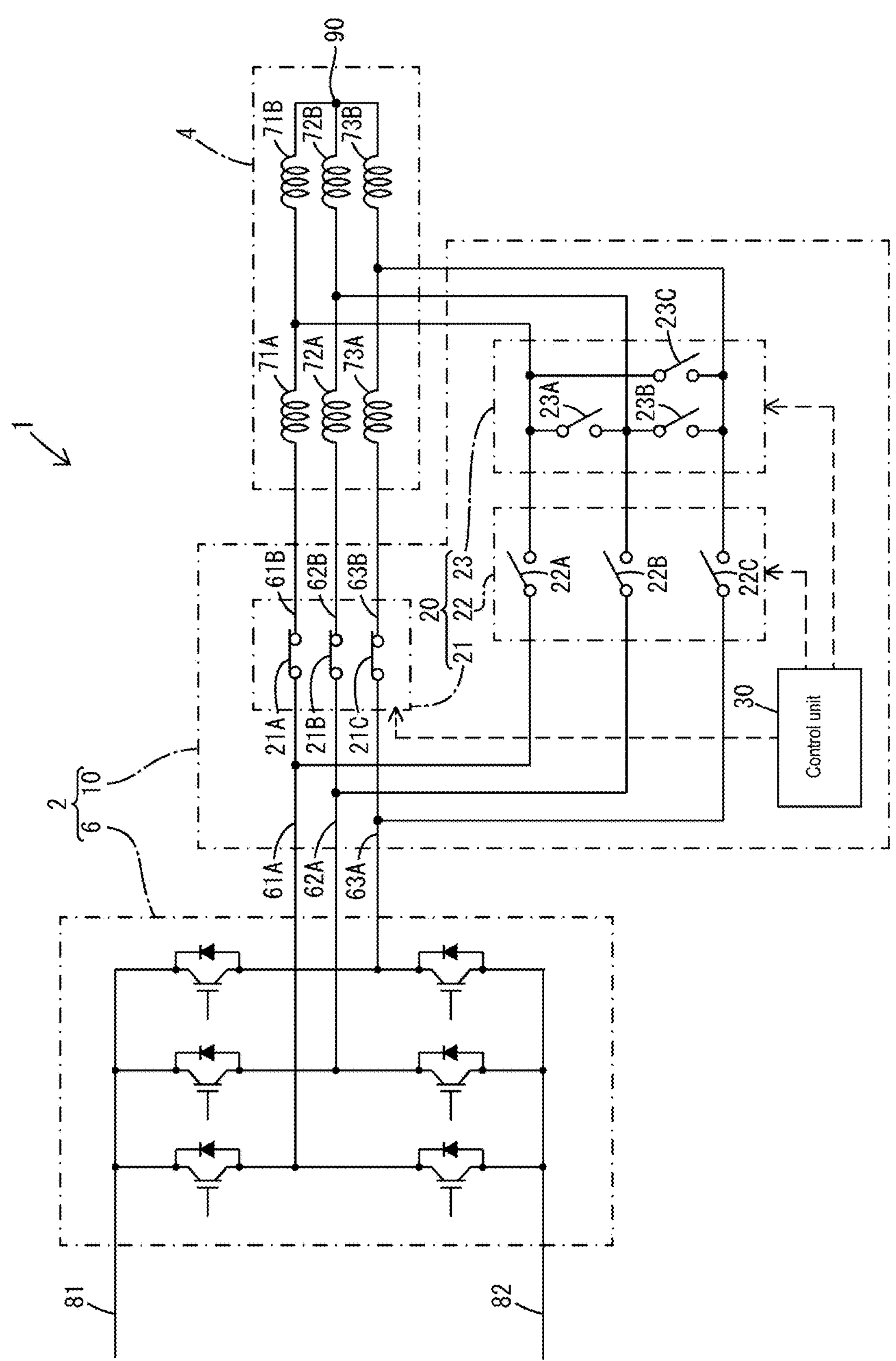
FIG. 5 is a diagram illustrating a third state of the switching device for an AC motor shown in FIG. 1.

As shown in FIG. 2, the third state is such that the first switching unit 21 is in the short-circuit state (first short-circuit state), the second switching unit 22 is in the release state (second release state), and the third switching unit 23 is in the release state (third release state). In the third state, electrical conduction target windings are the first windings 71A, 72A, and 73A, and the second windings 71B, 72B, and 73B. That is, the third state is a state in which electrical conduction control on the first windings 71A, 72A, and 73A and the second windings 71B, 72B, and 73B of the plurality of phase windings 71, 72, and 73 is allowed. As shown in FIG. 5, in the third state, the switches 21A, 21B, and 21C are in the ON state, the switches 22A, 22B, and 22C are in the OFF state, and the switches 23A, 23B, and 23C are in the OFF state, and the short-circuit unit 90 is the neutral point. Therefore, the first winding 71A and the second winding 71B that are connected in series overall function as a U-phase winding, and a driving current flows through these windings, and the first winding 72A and the second winding 72B that are connected in series overall function as a V-phase winding, and a driving current flows through these windings, and the first winding 73A and the second winding 73B that are connected in series overall function as a W-phase winding, and a driving current flows through these windings.

As shown in FIG. 2, the fourth state is such that the first switching unit 21 is in the release state (first release state), the second switching unit 22 is in the release state (second release state), and the third switching unit 23 is in the release state (third release state). In the fourth state, no driving current flows through the first windings 71A, 72A, and 73A, and no driving current flows through the second windings 71B, 72B, and 73B.

The control unit 30 controls the switching unit 20 to switch the switching unit 20 to any one of the above states. When a first condition is met, the control unit 30 causes the switching unit 20 to enter the first state by causing the first switching unit 21 to enter the first short-circuit state, the second switching unit 22 to enter the second release state, and the third switching unit 23 to enter the third short-circuit state. In this case, the on-board system 1 can be used to selectively supply power only to the first winding having a relatively large number of turns in each phase. On the other hand, when a second condition that is different from the first condition is met, the control unit 30 causes the switching unit 20 to enter the second state by causing the first switching unit 21 to enter the first release state, the second switching unit 22 to enter the second short-circuit state, and the third switching unit 23 to enter the third release state. In this case, the on-board system 1 can be used to selectively supply power only to the second winding having a relatively small number of turns in each phase. When a third condition, which is different from the first condition and the second condition, is met, the control unit 30 causes the switching unit 20 to enter the third state by causing the first switching unit 21 to enter the first short-circuit state, the second switching unit 22 to enter the second release state, and the third switching unit 23 to enter the third release state. In this case, the on-board system 1 can be used to supply power to the first winding and the second winding in each phase. When a fourth condition that is different from the first, second, and third conditions, is met, the control unit 30 causes the switching unit 20 to enter the fourth state by causing the first switching unit 21 to enter the first release state, the second switching unit 22 to enter the second release state, and the third switching unit 23 to enter the third release state. In this case, the on-board system 1 can stop the supply of power to the first winding and the second winding in each phase. It is sufficient that the first condition, the second condition, the third condition, and the fourth condition may differ from each other.

Examples of Effects

With the switching device 10, the first state is an operation pattern in which the first windings 71A, 72A, and 73A of the plurality of phase windings 71, 72, and 73 are selectively used, and the second windings 71B, 72B, and 73B are selectively not used. The second state is an operation pattern in which the second windings 71B, 72B, and 73B of the plurality of phase windings are selectively used, and the first windings 71A, 72A, and 73A are selectively not used. Because states are switched in this manner, the switching device 10 can generate an operation pattern in which the first windings 71A, 72A, and 73A are used while the influence of the second windings 71B, 72B, and 73B is suppressed, and an operation pattern in which the second windings 71B, 72B, and 73B are used while the influence of the first windings 71A, 72A, and 73A is suppressed. Furthermore, by switching to the third state, the switching device 10 can also generate an operation pattern in which the first winding and the second winding are used in each phase, and thus can further increase the number of operation patterns of the AC motor 4.

The switching device 10 can switch between at least three states (the first state, the second state, and the third state) using a simple method for changing a combination of the short-circuit states and the release states of the first switching unit 21, the second switching unit 22, and the third switching unit 23.

Because the switching device 10 can selectively use the first windings 71A, 72A, and 73A having a relatively large number of turns in the first state, impedance can be increased and larger torque can be generated with ease. On the other hand, because the switching device 10 can selectively use the second windings 71B, 72B, and 73B having a relatively small number of turns in the second state, impedance can be suppressed and suitability for high-speed operation can be enhanced with ease. In the third state, it is also possible to use not only the first windings 71A, 72A, and 73A having a relatively large number of turns but also the second windings 71B, 72B, and 73B, and thus torque can be further increased with ease.

In this specification, the above first condition may be "the rotation speed of the vehicle in which the in-vehicle system 1 is mounted is within the second rotation speed range". Also, the above second condition may be "the rotation speed of the vehicle in which the in-vehicle system 1 is mounted is within the third rotation speed range". Further, the above third condition may be "the rotation speed of the vehicle in which the in-vehicle system 1 is mounted is within the first rotation speed range". In this case, the first rotation speed range corresponding to the third condition may be a range in which the rotation speed of the vehicle is less than X1, the second rotation speed range corresponding to the first condition may be a range in which the rotation speed of the vehicle is greater than or equal to X1 and less than X2, and the third rotation speed range corresponding to the second condition may be a range in which the rotation speed of the vehicle is greater than or equal to X2. In this example, the second rotation speed range is a range in which the rotation speed is higher than the first rotation speed range, and the third rotation speed range is a range in which the rotation speed is higher than the second rotation speed range.

Figure 6:
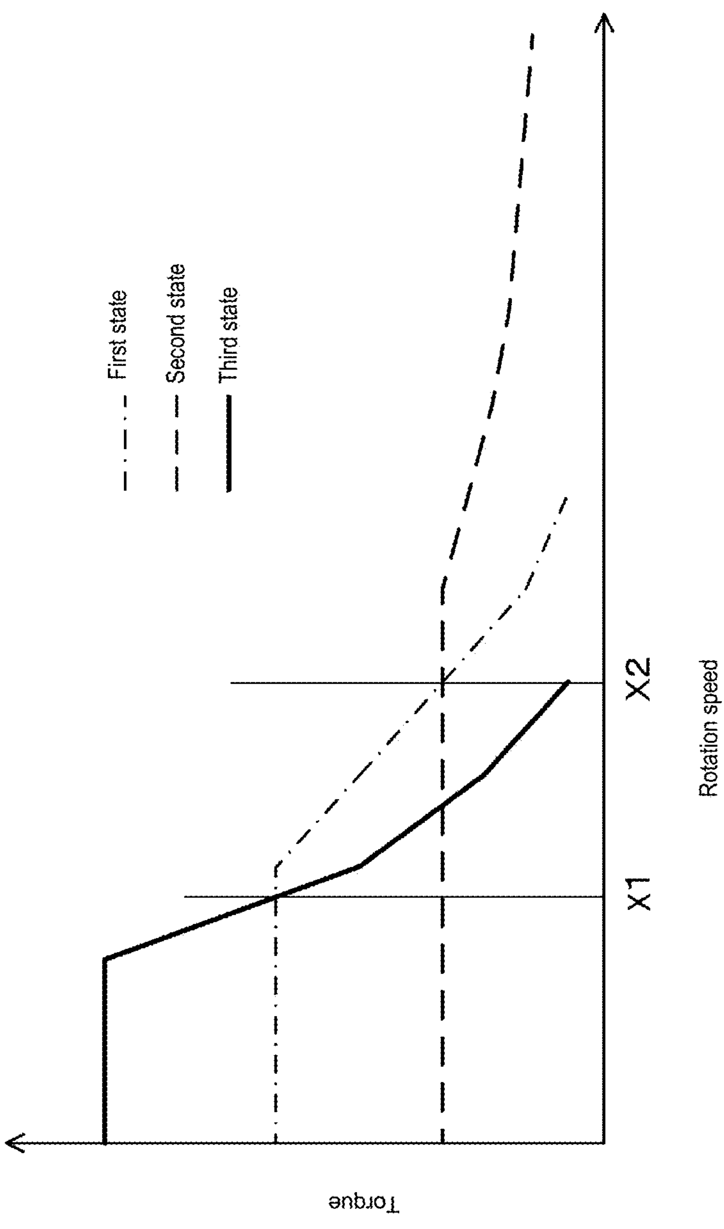
FIG. 6 is a graph showing a relationship between rotation speed and torque in each state, with regard to the AC motor used in the on-board system shown in FIG. 1.

In the AC motor 4, the relationship between the rotation speed and torque in each of the first state, the second state, and the third state is as shown in FIG. 6, for example. In the example shown in FIG. 6, the torque in the third state is the largest in the first rotation speed range in which the rotation speed of the vehicle in which the on-board system 1 is mounted is less than X1. Also, the torque in the first state is the largest in the second rotation speed range in which the rotation speed of the vehicle is greater than or equal to X1 and less than X2. Further, the torque in the second state is the largest in the third rotation speed range in which the rotation speed of the vehicle is greater than or equal to X2. In such an example, it is advantageous in situations where high torque is required at low rotation speeds, such as when the vehicle is started or is climbing a hill, if the control unit 30 controls the switching unit 20 to switch to the third state when the rotation speed of the vehicle is within the first rotation speed range in which the rotation speed of the vehicle is relatively low. Also, it is advantageous in situations where the frequency of acceleration and deceleration is low but high speed is maintained, such as when the vehicle is traveling on a highway, if the control unit 30 operates such that the switching unit 20 switches to the second state when the rotation speed of the vehicle is within the third rotation speed range in which the rotation speed of the vehicle is relatively high. Furthermore, it is advantageous in situations where the vehicle accelerates, decelerates, or changes course at a moderate speed, such as when the vehicle is traveling in urban areas, if the control unit 30 operates such that the switching unit 20 switches to the first state when the rotation speed of the vehicle is within the second rotation speed range.

Other Embodiments

The present disclosure is not limited to the embodiments described above and illustrated in the drawings. For example, features of the embodiments described above or below can be combined in any manner as long as they do not contradict each other. Also, any feature of the embodiments described above or below may be omitted unless specified as essential. Furthermore, the above embodiments may be modified as follows.

Although the switching device 10 has the control unit 30 in the above-described embodiment, the switching device need not have the control unit 30. For example, a switching device may be constituted only by the above-described switching unit 20, and the switching device (specifically, the switching unit 20) may be configured to perform a switching operation in response to reception of an instruction from an external device (e.g., a device having the same function as the control unit 30 described above).

Figure 7:
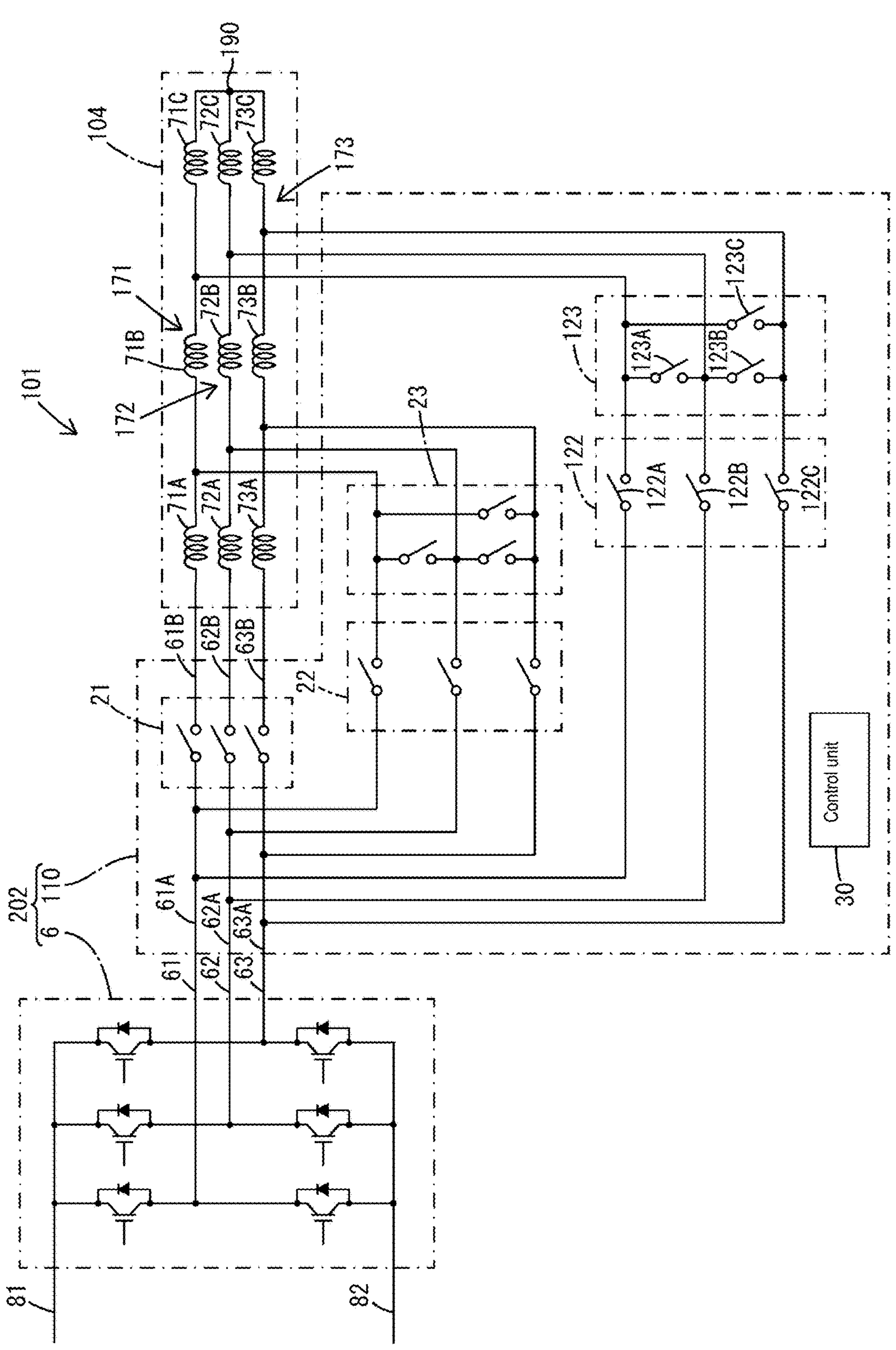
FIG. 7 is a circuit diagram schematically illustrating an on-board system including a switching device for an AC motor according to another embodiment.

Although each phase winding is divided in two in the above-described embodiment, each phase winding may be divided in three or more. FIG. 7 shows an on-board system 101 in which a motor drive device 202 is used in place of the motor drive device 2 shown in FIG. 1. In the motor drive device 202 shown in FIG. 7, an AC motor 104 is used in place of the AC motor 4 shown in FIG. 1. The AC motor 104 differs from that shown in FIG. 1 in that third windings 71C, 72C, and 73C are respectively provided between the opposite ends of the second windings 71B, 72B, and 73B and a short-circuit unit 190 in place of the configuration in which the opposite ends of the second windings 71B, 72B, and 73B and the short-circuit unit 90 are short-circuited as shown in FIG. 1, and the other configurations are similar to those of the AC motor 4 shown in FIG. 1. Like a U-phase winding 171, a V-phase winding 172, and a W-phase winding 173 in the AC motor 104 shown in FIG. 7, the third windings 71C, 72C, and 73C may be provided between the short-circuit unit 190 and each of the second windings 71B, 72B, and 73B. In this example, as shown in FIG. 7, it is sufficient that a fourth switching unit 122 that switches switches 122A, 122B, and 122C between the ON state and the OFF state, and a fifth switching unit 123 that switches switches 123A, 123B, and 123C between the ON state and the OFF state are provided. In the example shown in FIG. 7, in order to realize the above-described first state, it is sufficient that all of the switches 122A, 122B, 122C, 123A, 123B, and 123C are turned OFF in addition to controlling of the first state in the first embodiment, in order to realize the second state, it is sufficient that all of the switches 122A, 122B, and 122C are turned OFF and all of the switches 123A, 123B, and 123C are turned ON in addition to controlling of the second state in the first embodiment, in order to realize the third state, it is sufficient that all of the switches 122A, 122B, and 122C are turned OFF and all of the switches 123A, 123B, and 123C are turned ON in addition to controlling of the third state in the first embodiment, and in order to realize the fourth state, it is sufficient that all of the switches 122A, 122B, 122C, 123A, 123B, and 123C are turned OFF in addition to controlling of the fourth state in the first embodiment. Further, if all of the switching units 21, 22, 23, and 123 are turned OFF and the switching unit 122 is turned ON, it is possible to realize the fourth state in which the third windings 71C, 72C, and 73C are selectively used, without using the first windings and the second windings, and if all of the switching units 22, 23, 122, and 123 are turned OFF and the switching unit 21 is turned ON, it is possible to realize a fifth state in which all of the first windings, the second windings, and the third windings are used. Furthermore, states other than these states can also be realized. In the motor drive device 2, in a configuration in which each phase winding is divided into three or more, it is possible to select and use one type (one type out of first windings, second windings, and third windings in the configuration shown in FIG. 7), any two types, or all types of phase windings.

Note that the embodiments disclosed herein are to be considered in all respects as illustrative and not restrictive. The scope of the disclosure is not limited to the embodiments disclosed herein, and all changes that come within the range defined by the claims or the range of equivalency of the claims are intended to be embraced therein.

The invention claimed is:

1. A switching device for an AC motor, the switching device being for switching a connection state of windings of an AC motor having a plurality of phase windings, each phase winding including a first winding and a second winding, the switching device comprising:

a switching unit configured to switch a connection state of the plurality of phase windings, wherein the switching unit switches between a first state in which electrical conduction control on the first windings of the phase windings is allowed and electrical conduction control on the second windings of the phase windings is blocked, a second state in which electrical conduction control on the second windings of the phase windings is allowed and electrical conduction control on the first windings of the phase windings is blocked, and a third state in which electrical conduction control on the first windings and the second windings of the phase windings is allowed, the switching device further comprising:

a control unit configured to control the switching unit, wherein the plurality of phase windings include a first phase winding, a second phase winding, and a third phase winding, the switching unit includes a first switching unit configured to switch between a first short-circuit state and a first release state, a second switching unit configured to switch between a second short-circuit state and a second release state, and a third switching unit configured to switch between a third short-circuit state and a third release state, the first short-circuit state is a state in which a first conduction path and a first end portion that is one end of the first winding in the first phase winding are short-circuited, a second conduction path and a second end portion that is one end of the first winding in the second phase winding are short-circuited, and a third conduction path and a third end portion that is one end of the first winding in the third phase winding are short-circuited, the first release state is a state in which the short circuit between the first end portion and the first conduction path is released, the short circuit between the second end portion and the second conduction path is released, and the short circuit between the third end portion and the third conduction path is released, the second short-circuit state is a state in which the first conduction path and a fourth end portion that is one end of the second winding in the first phase winding are short-circuited, the second conduction path and a fifth end portion that is one end of the second winding in the second phase winding are short-circuited, and the third conduction path and a sixth end portion that is one end of the second winding in the third phase winding are short-circuited, the second release state is a state in which the short circuit between the fourth end portion and the first conduction path is released, the short circuit between the fifth end portion and the second conduction path is released, and the short circuit between the sixth end portion and the third conduction path is released, the third short-circuit state is a state in which opposite ends that include an opposite end of the first winding of the first phase winding, an opposite end of the first winding of the second phase winding, and an opposite end of the first winding of the third phase winding are short-circuited to each other, the third release state is a state in which the short circuit of the opposite ends to each other is released, and the control unit causes the switching unit to enter the first state by causing the first switching unit to enter the first short-circuit state, the second switching unit to enter the second release state, and the third switching unit to enter the third short-circuit state, causes the switching unit to enter the second state by causing the first switching unit to enter the first release state, the second switching unit to enter the second short-circuit state, and the third switching unit to enter the third release state, and causes the switching unit to enter the third state by causing the first switching unit to enter the first short-circuit state, the second switching unit to enter the second release state, and the third switching unit to enter the third release state.

2. The switching device for an AC motor according to claim 1, wherein the first winding of the first phase winding has a larger number of turns than the second winding of the first phase winding, the first winding of the second phase winding has a larger number of turns than the second winding of the second phase winding, the first winding of the third phase winding has a larger number of turns than the second winding of the third phase winding, and the control unit causes the switching unit to enter the third state when a rotation speed of a vehicle in which the switching device for an AC motor and the AC motor are mounted is within a first rotation speed range, causes the switching unit to enter the first state when the rotation speed of the vehicle is within a second rotation speed range in which the rotation speed is higher than the first rotation speed range, and causes the switching unit to enter the second state when the rotation speed of the vehicle is within a third rotation speed range in which the rotation speed is higher than the second rotation speed range.

* * * * *